US009014060B2

(12) United States Patent
Terpstra et al.

(10) Patent No.: US 9,014,060 B2
(45) Date of Patent: Apr. 21, 2015

(54) SYSTEM AND METHOD FOR INTEGRATING VOIP CLIENT FOR AUDIO CONFERENCING

(71) Applicant: Level 3 Communications, LLC, Broomfield, CO (US)

(72) Inventors: Richard Dean Terpstra, Superior, CO (US); Adam Charles Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/840,585

(22) Filed: Mar. 15, 2013

(65) Prior Publication Data

US 2013/0343232 A1   Dec. 26, 2013

Related U.S. Application Data

(60) Provisional application No. 61/662,863, filed on Jun. 21, 2012.

(51) Int. Cl.
*H04L 29/06* (2006.01)
*H04L 29/08* (2006.01)
*H04L 12/18* (2006.01)

(52) U.S. Cl.
CPC .............. *H04L 65/403* (2013.01); *H04L 67/02* (2013.01); *H04L 65/1093* (2013.01); *H04L 65/4038* (2013.01); *H04L 12/1818* (2013.01)

(58) Field of Classification Search
CPC ... H04L 65/403; H04L 67/02; H04L 12/1818; H04L 65/4038; H04L 65/1093
See application file for complete search history.

(56) References Cited

U.S. PATENT DOCUMENTS

| | | | |
|---|---|---|---|
| 2004/0037268 A1 | 2/2004 | Read | |
| 2004/0239754 A1* | 12/2004 | Shachar et al. | 348/14.08 |
| 2005/0108328 A1* | 5/2005 | Berkeland et al. | 709/204 |
| 2006/0268847 A1 | 11/2006 | Halbraich et al. | |
| 2006/0271813 A1* | 11/2006 | Horton et al. | 714/4 |
| 2008/0031232 A1 | 2/2008 | Shea et al. | |
| 2008/0120371 A1 | 5/2008 | Gopal | |
| 2008/0249796 A1 | 10/2008 | Croy et al. | |
| 2008/0279118 A1* | 11/2008 | Hyun et al. | 370/260 |
| 2009/0296930 A1 | 12/2009 | Krantz et al. | |
| 2011/0138319 A1 | 6/2011 | Sidman | |
| 2011/0149810 A1* | 6/2011 | Koren et al. | 370/261 |
| 2011/0150200 A1 | 6/2011 | Uhler et al. | |
| 2011/0270933 A1 | 11/2011 | Jones et al. | |

OTHER PUBLICATIONS

International Search Report, dated Jan. 10, 2014, Int'l Appl. No. PCT/US13/047023, Int'l Filing Date Jun. 21, 2013; 4 pgs.
Written Opinion of the International Searching Authority, dated Jan. 10, 2014, Int'l Appl. No. PCT/US13/047023, Int'l Filing Date Jun. 21, 2013; 6 pgs.

* cited by examiner

*Primary Examiner* — Jae Y Lee

(57) ABSTRACT

Aspects of the present disclosure disclose system, apparatus and methods for providing an integrated web conferencing. In various aspects, the disclosure is directed to integrating a VoIP client for audio conferencing with a web client. In particular, the system provides for integrating a web portion of a web conference with an audio portion of the web conference. More specifically, the system, apparatus and methods provide for connecting a VoIP client to an audio conferencing portion of the system to facilitate communications between client and server.

14 Claims, 5 Drawing Sheets

SYSTEM AND METHOD FOR INTEGRATING VOIP CLIENT FOR AUDIO CONFERENCING

CROSS REFERENCE TO RELATED APPLICATIONS

This application claims priority under 35 U.S.C. §119(e) to provisional application No. 61/662,863 titled "System and Method for Integrating VoIP Client for Audio Conferencing" filed on Jun. 21, 2012, which is hereby incorporated by reference herein.

FIELD OF THE DISCLOSURE

This disclosure relates in general to the field of communications, and more particularly, to system and method for providing web conferencing services with integrated video and audio components.

BACKGROUND

Web conferencing has become very popular in recent years. Often, web conferences where participants may view and interact with documents through user interfaces are accompanied with a phone conference. Typically, in order to participate in a web conference, a user is required to connect to the audio components of the conference separately from the web component of the conference. In such cases, the web conference is conducted over an Internet protocol (IP)/virtual private network (VPN) connection using packetized transport and the audio part of the conference is carried over, for example, a public switched telephone network (PSTN). The web conference and the audio portion of the conference, thus, occur at the same time but are not tightly coupled. More specifically, the two services are provided by distinct and separate mechanisms.

The audio conferencing component is typically accomplished by either a "dial-in" or "dial-out" call flow scenario. The "dial-in" methodology requires a customer to call a predefined number and supply information, such as an access code, that is associated with the meeting in order to join the audio part of the conference. The "dial-in" case is typically initiated manually by the user, and requires inputting an access code via a Dual Tone Multi Frequency (DTMF) signal. The "dial-out" methodology, on the other hand, requires a customer to supply their telephone number via a client interface, such as an application, web site, etc. that the conferencing system would use to call the customer. Typically there is no account code information exchanged in the call signaling or bearer (i.e. DTMF) in a dial-out system. Both the "dial-in" and "dial-out" call flow scenarios, as currently used, however, require the customer to separately access the web and audio components of the web conference which makes it inconvenient for the web conference participants.

It is with these concerns and issues in mind, among others, that aspects of the present invention were conceived and developed.

SUMMARY

One implementation of the present disclosure may take the form of a conferencing apparatus for providing an integrated web conference. In particular, the apparatus comprising a computer-readable medium with a computer instructions that when executed on one or more processors perform the operations of sending a registration request from a voice over IP (VoIP) client configured to conduct and audio portion of a web conference to a registration device associated with a network able to provide a web portion and the audio portion of the web conference, the registration request including an identification of the VoIP client. The computer instruction further cause one or more processors to perform the operation of receiving at the VoIP client a registration information of the VoIP client from the registration device and requesting by a web client configured to conduct the web portion of the web conference a dial-out from the network to the VoIP client based on the received information.

Another implementation of the present disclosure may take the form of a method for providing an integrated web conference. The method includes the operations of sending a registration request from a voice over IP (VoIP) client configured to conduct an audio portion of a web conference to a first registration device associated with a network able to provide a web portion and the audio portion of the web conference, the registration request including an identification of the VoIP client. The method further includes the steps of receiving at the VoIP client a registration information of the VoIP client and requesting by a web client configured to conduct the web portion of the web conference a dial-out from the network to the VoIP client based on the received registration information. Finally, the method includes, receiving at the VoIP client, in coordination with the web portion of the web conference, the audio portion of the web conference.

Yet another implementation of the present disclosure may take the form of a conferencing apparatus for providing an integrated web conference, the apparatus including a network device of a network able to provide a web portion and an audio portion of the web conference. The network device comprising at least one processor in communication with a computer-readable medium with computer instructions that, when executed by the at least one processor perform the operations of receiving from a web client executing on a client device and configured to conduct the web portion of the web conference, a request to conduct the audio portion of the web conference using a VoIP client executing on the client configured to conduct the audio portion of the web conference. The computer-readable medium comprising instructions that further cause the at least one processor to initiate a dial-out from the network to the VoIP client to establish an integrated web conference.

DETAILED DESCRIPTION

Aspects of the present disclosure involve systems, apparatus, methods, computer program products, and the like, for providing a web conferencing service. In one example, the system and methods involve providing a voice over IP (VoIP) client in order to integrate video and audio components of a web conferencing service. More particularly, an integrated web conferencing service as disclosed allows customers to use a single client user interface to participate in a web conference.

According to one embodiment, a VoIP client, such as for example, a session initiation protocol (SIP) compatible VoIP client, is integrated with a web client. The integration of the VoIP client into the web client, which conventionally does not provide audio signaling and is not an audio bearer, allows the user to utilize a number of different (e.g. existing) user interface without the need to develop a stand along VoIP client interface. For example, the VoIP client may be initiated via such client user interfaces as LVLT Connect™, Webex Meeting Center™, WebMeeting™, or any other client user interface that allows the user to join or connect to a web conference. Unlike most conventional systems, the web conferencing client is tightly integrated with the VoIP client thereby providing the user with an integrated and coordinated user experience.

Figure 1:
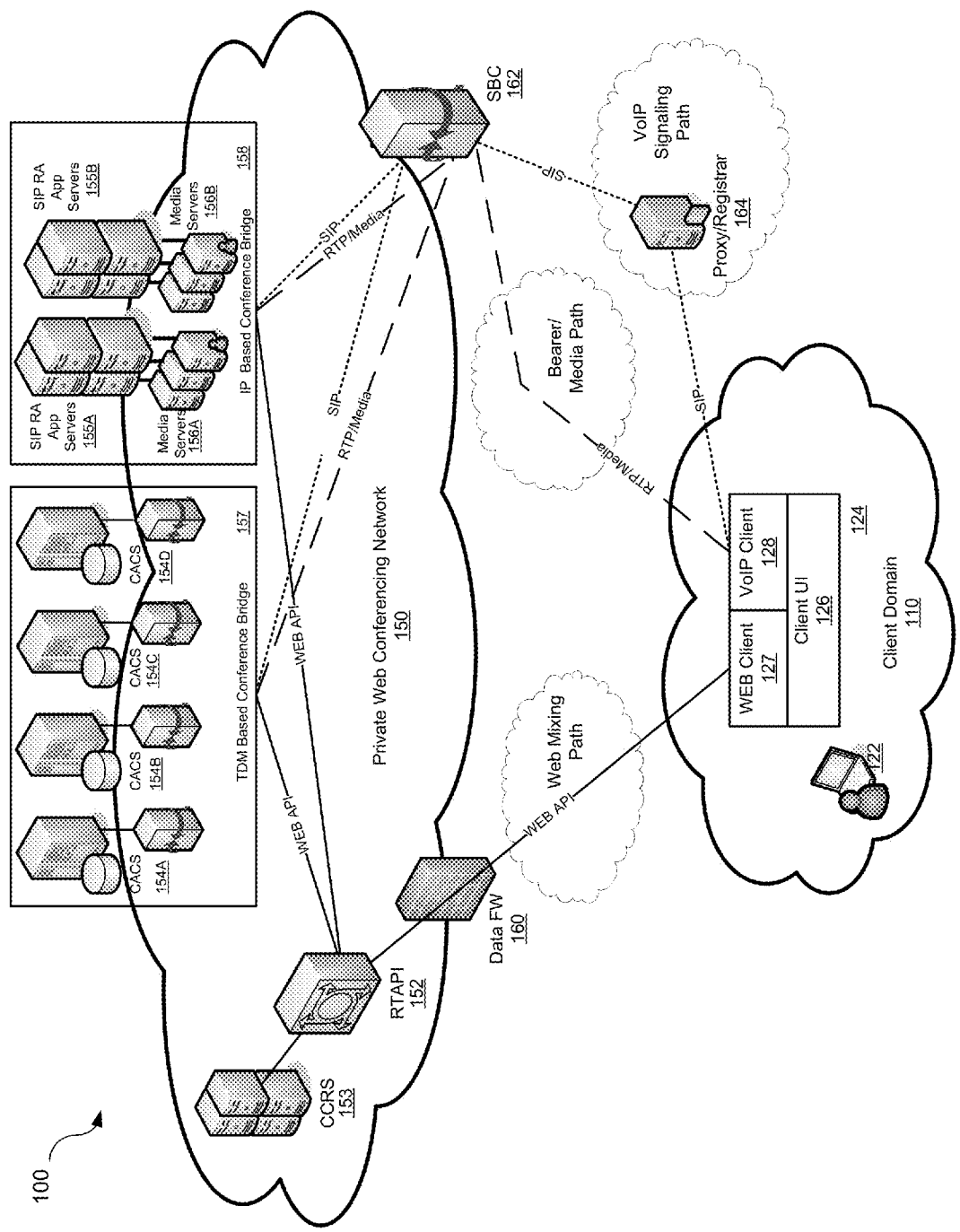
FIG. 1 is a schematic diagram illustrating an exemplary operating environment for providing integrated web and audio conferencing in accordance with one embodiment.

As indicated in FIG. 1, in one possible embodiment, a conferencing system 100 involves a client domain 110 and a private web conferencing network 150 configured to host and run web conferencing and to provide voice services. In particular, the private web conferencing network 150 provides both web mixing and voice mixing components of a web conference. In the example shown in FIG. 1, the client domain 110 may be a corporate network or other private network separated from a public network, such as the Internet, by a firewall 160. One or more client devices 122, such as a smart phone, tablet computing device, personal computer, workstation, etc. are operating in the client domain. The client device includes a client application 124 that allows a user to participate in a web conference with integrated audio services. In particular, the client application includes a client user interface 126 that provides access to the functionality of client application, and further includes a web conferencing client 127 and a VoIP client 128. In one specific example, the VoIP client 128 may be "Headless SIP Client" (HSC) that is tightly coupled with and used together with the web client. The client user interface 126 may include LVLT Connect™, Webex Meeting Center™, WebMeeting™, or any other client user interface that allows the user to join or connect to a web conference as discussed above.

The private web conferencing network includes a real-time application programming interface (RTAPI) 152, one or more conference call routing servers (CCRS) 153, one or more IP based conference bridges 158 that may include, for example, one or more session initiation protocol ready access (SIP RA) application servers 155 and media servers 156, and/or one or more TDM based conference bridges 157, that may include, for example, one or more conference allocation and control systems (CACS) 154, all of which provide an integrated web conferencing service to the user, among other services. At the edges of both the client domain and the private web conferencing network are located firewalls, such as data firewall (Data FW) 160 and session border controllers (SBC) 162 that help to keep both the client domain and the network secure. A proxy/registrar 164 for registering VoIP clients can be either combined with the session border controller (SBC) or may be a separate stand alone unit or application located either within the private network, the client domain, or otherwise.

In general, the RTAPI 152 provides a single interface through which clients can interact with the web conferencing system via the WEB API. In particular, the RTAPI may be used to mask or hide the actual platforms located within the web conferencing system and may serve as command interpreter between the clients and the various platforms. In some instances, the RTAPI may provide such functionality as client application authentication, subscription verification, conference bridge and conference state determination, dial-out, etc, among others. The RTAPI may also provide web conference related information, such as a roster of conference participants, current speaker, etc. For example, the RTAPI may rely on a call routing application, such as CCRS, to determine bridge route information, such as the bridge through which a conference is occurring or is to occur. The RTAPI may then establish a socket connection and a client application session to an appropriate platform based on the provided bridge route information. In particular, the RTAPI may issue a dial-out request to either CACS or a SIP RA servers to perform the actual dial-out to the appropriate VoIP client(s).

To determine a bridge route information, the CCRS 153 may be structured to accept information from other systems and/or applications that may aid the CCRS in the determination process. In particular, the CCRS may use a telephone number, an access number, an access code, and/or pin supplied, for example, to the RTAPI 152 through a user interface located on the client device. Additionally, the CCRS may use traffic information received from the IP based conference bridge 158 and/or TDM based conference bridge 157 in order to determine the requested conference bridge information.

The CACS and SIP RA servers in general, serve as audio conferencing bridges and communicate with one or more network devices to establish the web conference. In particular, the CACS and the SIP RA servers provide the audio/voice mixing for the audio part of the web conference and coordinate audio/voice traffic. For example, some of the CACS and SIP RA functionality may include dialing out to any registered VoIP clients and managing the flow of the audio signal between the clients. Depending on the type of the audio signal and/or the network on which the conference is carried, the audio portion of the conference may be conducted through either CACS or SIP RA conferencing platform. In particular, the CACS server, which is a time division multiplexing (TDM)/circuit-switched based audio conferencing platform, may be used to conduct audio portion of the web conference that is conducted utilizing TDM-based components of the network. The SIP RA server, on the other hand, provides a platform for conducting VoIP calls for IP-based networks.

The data firewall (data FW) 160 and SBC 162 control access to the private web conferencing network. Although not shown in the figure, data FW(s), as well as an SBC(s) may be also located at the edge of the client domain. The data FW may be used to help keep the network secured by filtering the incoming and outgoing packetized web data network traffic. The VoIP traffic, on the other hand may be directed and filtered through the SBC. In one implementation, in addition to providing network security, the SBC may also facilitate connectivity between various parts of a network, provide quality of service policy of a network and prioritization of flow, as well as media services among other functions. The SBC, thus, may be involved in controlling the signaling and media streams involved in setting up, conducting and tearing down telephone calls or other interactive media communications. When a separate proxy/registrar server (e.g. a SIP proxy/registrar) is provided in the system, the signaling functions needed by the client (e.g. VoIP client) to operate may be performed by the proxy/registrar server instead of the SBC. In such an instance, the proxy/registrar may be used set up a call and perform such functions as registration, authorization, network access control, including call routing control, and some network security among other functions.

Figure 2:
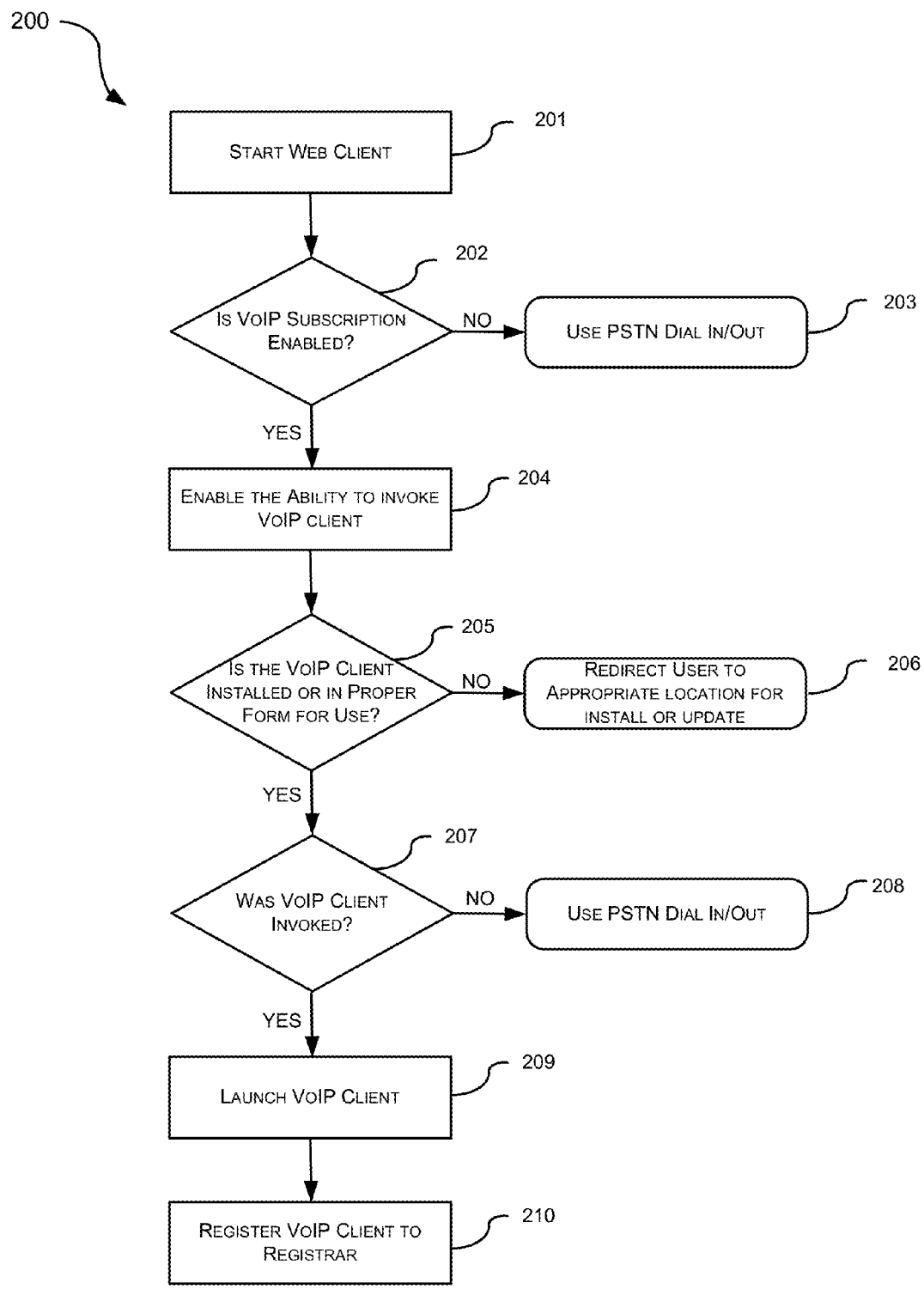
FIG. 2 is a flow diagram depicting an initiation of the integrated web conferencing service.

FIG. 2 is a flow diagram illustrating one possible method of initiating a web conference with an integrated audio portion within the system shown in FIG. 1. To begin, a user in the client domain 110 may initiate a web conference and/or indicate a desire to participate in a web conference by accessing a web conferencing client application 124 running on a client device located in the client domain 110. More specifically, the user may begin the web conference by invoking or otherwise executing the web client (step 201) of the web conferencing client application through the client user interface 126 in order to connect to the web mixing portion of the private web conferencing network.

To initiate a new web conference or to connect to an existing web conference, the web client may at first verify the user's credentials and ability to initiate or participate in the web conference. In particular, the web client may prompt the user to supply user credentials, such as, the level of the user's subscription, an access code, a pass code, or the like. Alternatively, the web client may extract information previously stored on the user's system to verify the user's ability to initiate or participate in the web conference. Depending on the implementation, the web client may pass information regarding the user's credentials to a verification system or application residing in the private web conferencing network as part of the verification process. For example, information may be sent through the WEB API to the RTAPI server 152 or any other network component responsible for authenticating the user's subscription. Alternatively, the web client residing at the client domain may have subscription information residing within the web client in which case subscription validation would be performed at the client domain. According to one embodiment, the system may be designed to determine if the user's subscription to the web conferencing service permits, for example, use of a "headless SIP client" or any other VoIP client (step 202) as part of the web conferencing environment. Stated differently, the system determines whether the user's subscription includes the tightly integrated audio conferencing features discussed herein.

In the event that the subscription is not enabled or otherwise does not include integrated audio services, the user is directed to conduct the audio portion of the web conference through a conventional PSTN "dial-in" or "dial-out" call method (step 203). In other words, the audio portion of the web conference in the system not enabled for integrated services would be conducted using the traditional voice mixing transport through the PSTN network. The subscription in which a VoIP audio or VoIP client is enabled, on the other hand, provides the user with the ability to invoke the VoIP client (step 204). In such a case, the audio portion of the web conference is conducted via packetized transport over the IPVPN/Internet. According to one embodiment, the ability to select VoIP client may be enabled, for example, by the RTAPI server once the user's credentials are verified. In particular, in response to a command sent by the RTAPI to the client domain, a newly presented button or previously "grayed" button may become available within the user interface that allows the user to select the enabled VoIP client.

Following the VoIP client enablement, the system may proceed to determine whether the VoIP client is installed, the VoIP client is the correct version, and/or the VoIP client is otherwise in proper form for use (step 205). In one specific implementation, the RTAPI may access or send a request to the client domain to determine the presence or form of the VoIP client. In case that the VoIP client is not installed or the VoIP client version is outdated, the system may redirect the user to a website to install the new and/or latest version of the VoIP client or may otherwise provided the user with information as to how to obtain the VoIP client (step 206). For example, a link to download and install the audio client or a new version of the audio client may be provided to the user to facilitate the installation and upgrade process.

Once a successful installation of the VoIP client and/or proper presence is confirmed, the user is provided with an option to invoke the VoIP client (step 207) which when selected instantiates the VoIP client in the client domain (step 209). Alternatively, if the user chooses not to invoke the VoIP client, even if the VoIP client is enabled, the user may rely on the conventional PSTN "dial-in" or "dial-out" call methods (step 208) to receive the audio portion of the web conference as discussed above.

Upon launching of the VoIP client, the system may proceed to register the VoIP client before allowing for a tightly integrated VoIP session to occur within the web conferencing environment (step 210). The registration process, in accordance with one embodiment, is provided in order to ensure a higher likelihood of a successful voice connection, particularly when one or more firewalls, network address translators (NAT), and other mechanisms and devices reside between the client device 124 and the private network 150. In particular, the registration process, besides confirming the user's identity and ability to access the system, may open access through such firewalls and confirm that the client may be accessed. Moreover, the registration request from the client device may open and temporally maintain access through such firewalls if and when signals or voice connections are returned or made to the registrant.

Figure 3:
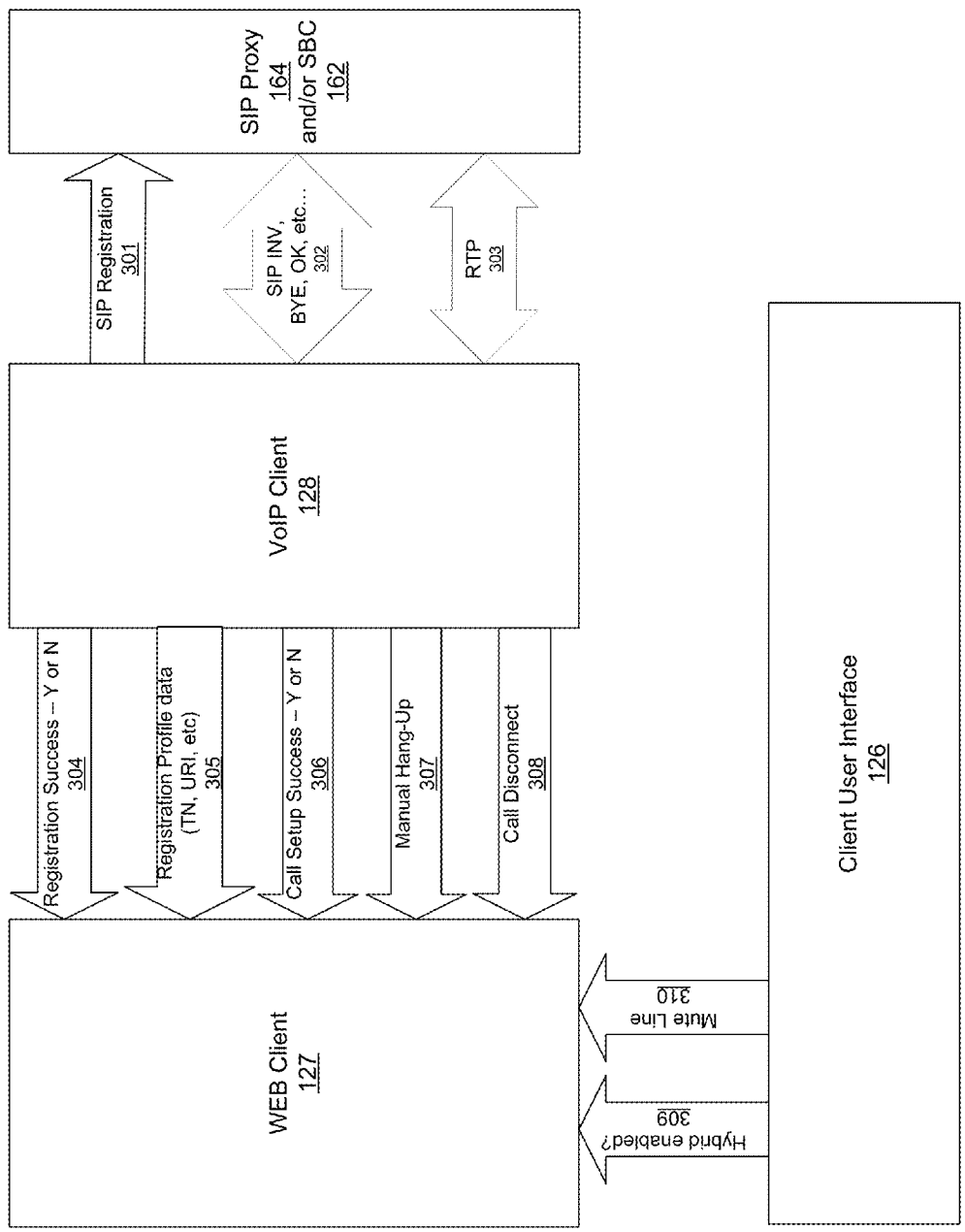
FIG. 3 is a schematic diagram depicting communication between various components in the system in accordance with one embodiment.

According to one embodiment, shown in FIG. 3, in order to register a newly instantiated VoIP client 128, the VoIP client may send a registration request 301 to the SIP proxy/registrar 164 and/or the SBC 162. In particular, the VoIP client may send or include a specific identifier, such as for example, a phone number or VoIP phone identifier or network address, a SIP URI or any other unique ID in the registration request 301 to the SIP proxy/registrar and/or SBC 162. According to one implementation, the VoIP client may include a list of predefined registrars available for processing the registration requests. The VoIP client may select one of the available SIP proxies/registrars and/or SBCs and register the VoIP client at the selected SIP proxy/registrar and/or SBC. For example, the VoIP client may use a domain name system (DNS) information included in a "host" field of a request-URI message to select an appropriate SIP proxy/registrar and/or SBC. In particular, the VoIP client may use a fully-qualified domain name (FQDN), such as for example, "company.com" and resolve it to an appropriate registrar IP address or use a numeric address (e.g. IPv4 or IPv6 address) included in the "host" filed to determine the SIP proxy/registrar and/or SBC.

The SIP proxy/registrar 164 and/or SBC 162 may begin to process the registration request once it is received. In particular, the SIP proxy/registrar and/or SBC may store VoIP client registration information, for example, in a database provided on the SIP proxy/registrar and/or SBC or connected therewith. The SIP proxy/registrar 164 and/or SBC 162 may also generate additional information that may facilitate identifying and integrating a specific VoIP client into a particular web conference. For example, the SIP proxy/registrar 164 and/or SBC 162 may generate an audio conference identifier that may be temporarily associated with the web conference and the client device. More specifically, the SIP proxy/registrar 164 and/or SBC 162 may create a "use once" and discard temporary ID created uniquely for the conference, whereby the system establishes the audio conference with the temporary identifier rather than a permanent identifier associated with the client device or the VoIP client. In one specific implementation, the temporary identification number maybe a hash value or a number assigned by the SIP proxy/registrar and/or SBC to the specific VoIP client.

Following the VoIP client registration process, the SIP proxy/registrar and/or SBC may return a simple acknowledgment message to the VoIP client, as shown in FIG. 3, confirming the success or failure of the registration process by way of a SIP 302 or RTP 303 message. Additionally, if generated, the SIP proxy/registrar and/or SBC may return the temporary ID along with the VoIP client registration status. The registration request may also serve to open a "pinhole" or other access through one or more firewalls for a return audio connection to the client device.

Referring still to FIG. 3, the registration status (e.g. registration success or failure) returned to the VoIP client 128 from the SIP Proxy 164 and/or SBC 162 may be sent to the web client to allow the system to conduct an integrated web conference. In one specific implementation, the VoIP client may extract information on the registration status from the message received from the SIP proxy and/or SBC and provide it to the web conferencing client. According to one embodiment, the information sent to the web client may include a simple indication of successful registration (e.g. Yes or No) 304 or alternatively the VoIP client may send registration profile data (e.g., telephone number, URI, etc.) 305, call setup success information (e.g. Yes or No) 306, manual hang-up information 307 or call disconnect information 308 among others, along with a acknowledgment message to facilitate call setup for the audio portion of the web conference. Although, the VoIP client may simply relay some of the information provided by the SIP proxy and/or SBC to the web client, the VoIP client may provide additional information, as needed, that may not otherwise be included in the SIP or RTP message received from the SIP proxy and/or SBC in order to provide an integrated web conference. Stated differently, although the information sent from the VoIP client to the web client may be driven by the information sent to the VoIP client from the SIP proxy and/or SBC, additional information may be generated by the SIP client to further facilitate the integration of the VoIP client into the web conference.

In addition to receiving the VoIP client registration status, the web client may also receive information from the client user interface 126 regarding user preferences for conducting the web conference. In particular, the user may, through the user interface, inform the web client of the start or termination of the web conference, the desire to use the VoIP client or not (even if the VoIP client is enabled) 309, or to mute the conference sound 310, among others. The web client, upon receiving both the VoIP client registration and user preference information may contact RTAPI server via the WEB API to provide the integrated web conferencing service based on the user selected preferences.

Figure 4:
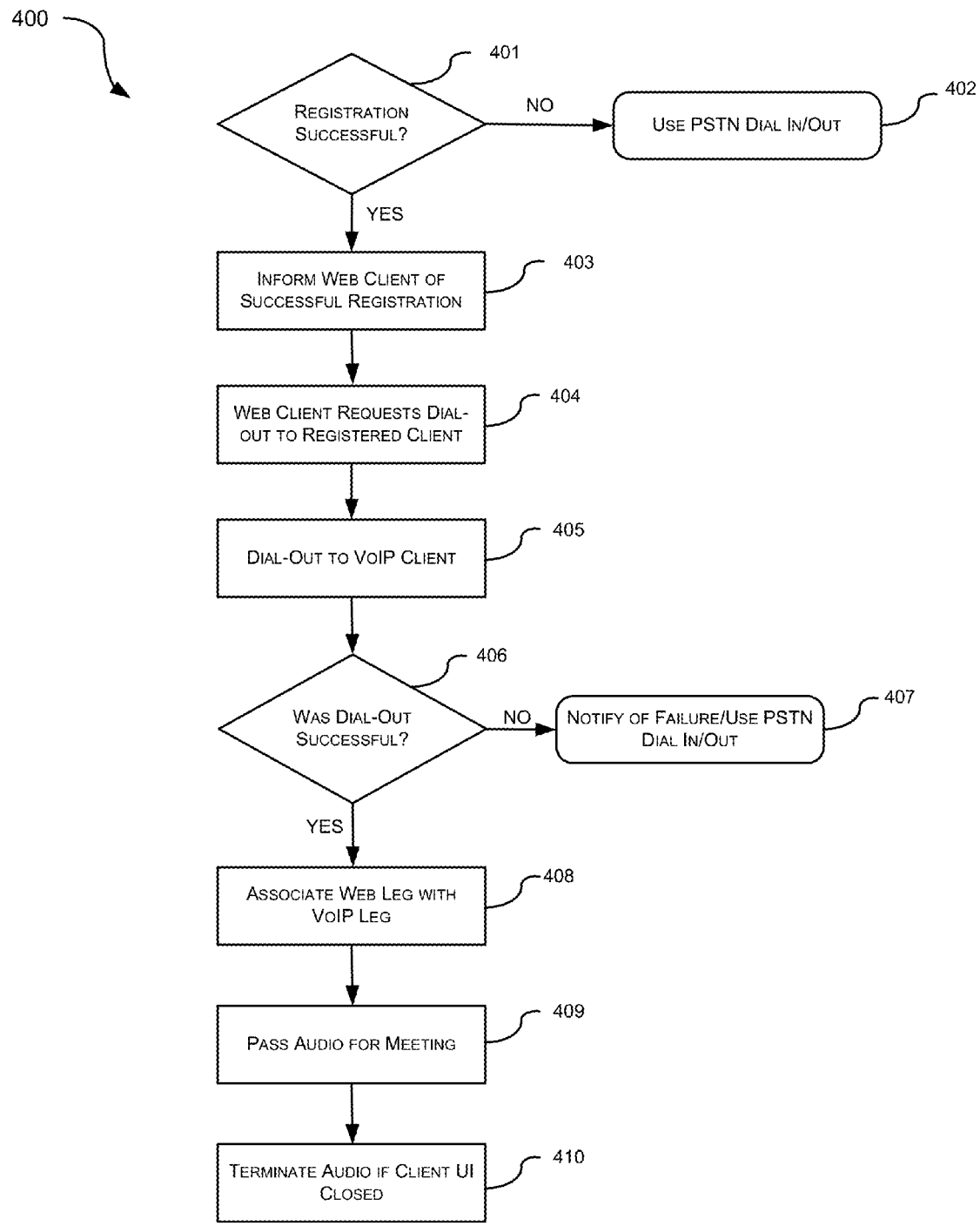
FIG. 4 is a flow diagram depicting a call flow utilizing the integrated web conferencing service.

FIG. 4 illustrates a flow diagram of one possible method of providing an integrated web conferencing experience to a user following the VoIP client registration process. In particular, following the registration process, the SIP proxy/registrar and/or SBC determines the success of the VoIP client registration (step 401). The SIP proxy/registrar and/or SBC then returns the determined registration status information to the VoIP client. According to one implementation, the failure to register the VoIP client may involve communicating to the user through, for example, the client user interface by way of a message that the VoIP client failed to register. The user interface may also provide a message instructing the user to establish a conventional PSTN "dial-in" or "dial-out" audio portion of the web conference or make another attempt to register the VoIP client (step 402). The successful VoIP client registration, on the other hand, may initially involve passing registration status along with other audio related information (received from the SIP proxy and/or SBC) to the web client (step 403). More specifically and as discussed above, the VoIP client may extract registration status information from the message received from the SIP proxy and/or SBC and provide that information to the web client.

The web client, upon receiving information of the successful VoIP client registration, may request a "dial-out" to the registered client (step 404) by way of the RTAPI 152. In particular, the web conferencing client 127 may initiate the audio conference, via WEB API and/or RTAPI, and notify a voice mixing plane control of the conference bridge infrastructure provided by the CCRS, SIP RA, CACS, etc. of a successful registration. The web client may also, at this time, request for dial out to occur to the registrant by including the registered client information in the request. In one specific implementation, when the web conference is conducted over a TDM/circuit-switched platform, a request to dial-out may include a specific direct inward dial (DID), which may be a telephone number associated with the registered client.

The RTAPI uses the information received from the CCRS to contact the appropriate conference bridge over the WEB API and requests a dial-out to the registered VoIP client (step 405). In other words, the RTAPI sends a message that includes SIP information to either the CACS 154 and/or the SIP RA application sever 155 that may then contact the registered VoIP client to provide an integrated web conference.

The CACS and/or SIP RA components of the private web conferencing network that are responsible for coordinating audio/voice traffic and connecting various network components execute the dialing-out to the registrant. When the dial-out from the CACS or SIP RA application server to the VoIP client is successful (step 406), the web leg (e.g. web portion) is associated with the VoIP leg (e.g. audio portion) in the client user interface and the voice mixing and web mixing components of the web conference are integrated. Stated differently, both the web and the audio portions of the web conference are associated in the client user interface (step 408) and audio is passed to the meeting participant (step 409). Because there is a tight coupling between the web client 127 and the VoIP client 128, the association of the web and audio portions of the web conference may be performed by either the web client or the VoIP client depending on the nature of the activity (e.g. WEB vs VoIP).

The unsuccessful dial-out to the registrant may result in a notification of the failure being sent to the client device via a web leg to the web conferencing application, and the user is instructed to use the conventional PSTN dial-in or dial-out to receive the audio part of the web conference (step 407). According to one embodiment, the failure to successfully dial-out may be determine after, for example, three failed attempts.

Upon the completion of the web conference or in the event that the client user interface is closed thereby terminating the audio portion of the conference, the VoIP client is closed and no longer available for use (step 410). In one specific implementation, the VoIP client may be de-registered once it is no longer in use and a message indicating VoIP client status may be provided.

The methods disclosed herein include various steps that may be embodied in machine-executable instructions or software, which may be used to cause a general-purpose or special-purpose processor programmed with the instructions to perform the steps. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Figure 5:
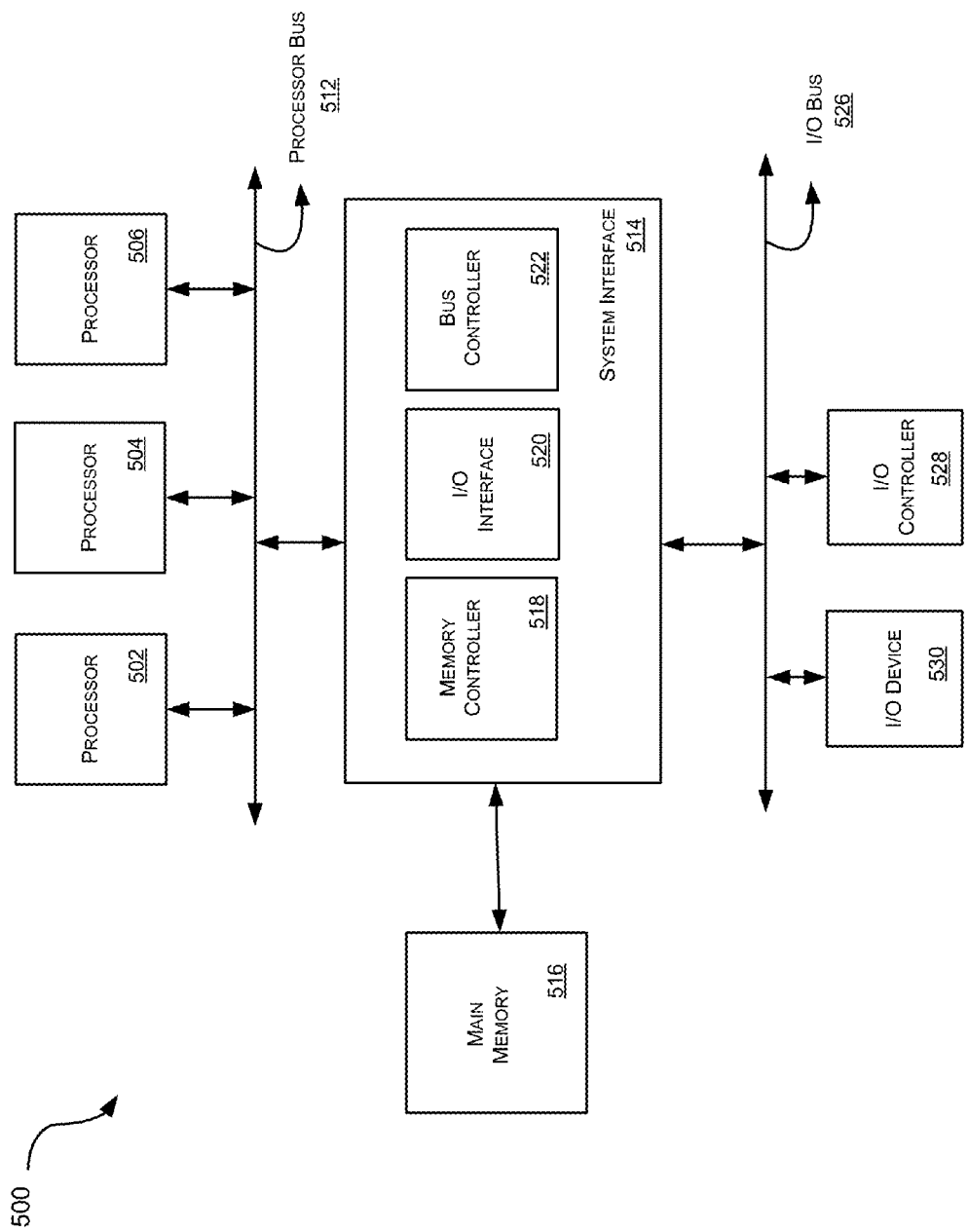
FIG. 5 is a diagram illustrating an example of a computing system which may be used in implementing embodiments of the resent disclosure.

FIG. 5 is a block diagram illustrating an example of a computing device or computer system 500 which may be used in implementing embodiments of the present invention. The computer system includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be a special purpose processors built for processing/mixing media data, such as audio or video components of a media stream.

System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to one or more processors 502-506 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer or other electronic device) to perform a process according to the present disclosure. Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A conferencing apparatus comprising:
   a non-transitory computer-readable medium with computer instructions stored therein that, when executed by one or more processors cause the one or more processors to perform the operations of:
   sending a registration request from a voice over IP (VoIP) client configured to conduct an audio portion of a web conference to a first registration device associated with a network able to provide a web portion and the audio portion of the web conference, the registration request including an identification of the VoIP client;
   receiving at the VoIP client a registration information of the VoIP client from the first registration device;
   requesting by a web client configured to conduct the web portion of the web conference a dial-out to the VoIP client from the network based on the received registration information; and
   receiving at the VoIP client, in coordination with the web portion of the web conference, the audio portion of the web conference.

2. The apparatus of claim 1 wherein the VoIP client stores a list of a plurality of registration devices in the computer-readable medium including the first registration device, the plurality of registration devices available for processing the registration request.

3. The apparatus of claim 2 wherein the instructions further cause the one or more processors to perform the operations of selecting by the VoIP client the first registration device from the plurality of registration devices.

4. The apparatus of claim 1 wherein the VoIP client identification information includes a phone number, a VoIP phone identifier, and a network address, or a session initiation protocol uniform resource identifier.

5. The apparatus of claim 1 wherein the first registration device is capable of storing the VoIP client registration information in the computer-readable medium.

6. The apparatus of claim 1 wherein the registration information includes a temporary audio conference identifier, the temporary audio conference identifier for connecting the VoIP client to the web conference.

7. The apparatus of claim 6 wherein the temporary audio conferencing identifier is unique to the web conference.

8. The apparatus of claim 7 wherein the audio conferencing identifier is a hash value generated and assigned to the VoIP client by the first registration device.

9. The apparatus of claim 1 wherein the operation of sending a registration request opens access through a firewall for returning an audio connection to the client device.

10. The apparatus of claim 1 wherein the VoIP client provides the registration information to the web client.

11. The apparatus of claim 1 wherein the VoIP client is a headless VoIP client, the headless VoIP client not being independently accessible to establish a VoIP call.

12. The apparatus of claim 1 wherein the instructions further cause the one or more processors to perform the operation of enabling the VoIP client at the client device following a verification of user credentials.

13. The apparatus of claim 1 wherein the registration information includes a registration status of the VoIP client, the registration status of the VoIP client being used to initiate the dial-out to the VoIP client.

14. A method for providing an integrated web conference, the method comprising:
   sending a registration request from a voice over IP (VoIP) client configured to conduct an audio portion of a web conference to a first registration device associated with a network able to provide a web portion and the audio portion of the web conference, the registration request including an identification of the VoIP client;
   receiving at the VoIP client a registration information of the VoIP client from the first registration device;
   requesting by a web client configured to conduct the web portion of the web conference a dial-out to the VoIP client from the network based on the received registration information; and
   receiving at the VoIP client, in coordination with the web portion of the web conference, the audio portion of the web conference.

* * * * *